US011151602B2

(12) United States Patent
Newell et al.

(10) Patent No.: US 11,151,602 B2
(45) Date of Patent: Oct. 19, 2021

(54) APPARATUS, SYSTEMS AND METHODS FOR ACQUIRING COMMENTARY ABOUT A MEDIA CONTENT EVENT

(71) Applicant: DISH Network L.L.C., Englewood, CO (US)

(72) Inventors: Nicholas Newell, Centennial, CO (US); Swapnil Tilaye, Louisville, CO (US)

(73) Assignee: DISH Network L.L.C., Englewood, CO (US)

( * ) Notice: Subject to any disclaimer, the term of this patent is extended or adjusted under 35 U.S.C. 154(b) by 310 days.

(21) Appl. No.: 15/966,257

(22) Filed: Apr. 30, 2018

(65) Prior Publication Data
US 2019/0333094 A1    Oct. 31, 2019

(51) Int. Cl.
*G06Q 30/06* (2012.01)
*G06Q 30/02* (2012.01)
*G06F 16/332* (2019.01)
*G06F 16/9535* (2019.01)

(52) U.S. Cl.
CPC ..... *G06Q 30/0245* (2013.01); *G06F 16/3329* (2019.01); *G06F 16/9535* (2019.01)

(58) Field of Classification Search
None
See application file for complete search history.

(56) References Cited

U.S. PATENT DOCUMENTS

| 7,253,817 | B1* | 8/2007 | Plantec | G06Q 30/02 345/418 |
| 8,161,504 | B2 | 4/2012 | Newell | |
| 2001/0049620 | A1* | 12/2001 | Blasko | G06Q 10/10 705/14.53 |
| 2003/0093784 | A1* | 5/2003 | Dimitrova | H04N 7/18 725/10 |
| 2003/0156134 | A1* | 8/2003 | Kim | G06Q 30/02 715/753 |
| 2005/0273390 | A1* | 12/2005 | Hunter | G06Q 30/0277 705/14.61 |
| 2009/0051681 | A1* | 2/2009 | Sharp | A63F 13/61 345/419 |
| 2011/0307919 | A1* | 12/2011 | Weerasinghe | H04N 21/23424 725/32 |

(Continued)

*Primary Examiner* — Eric R Netzloff
(74) *Attorney, Agent, or Firm* — Perkins Coie LLP

(57) ABSTRACT

A query session system and method is operable to determine a current location of a consumer conversation acquisition system when the consumer conversation acquisition system is a mobile electronic device or determine a current operation of the consumer conversation acquisition system when the consumer conversation acquisition system is stationary. Stored state information corresponding to the determined location or operation is accessed that identifies one of a receptive state of the consumer, an unreceptive state of the consumer, or optionally an indeterminate state of the consumer. The query session is presented to the consumer when the consumer is the receptive state. A query session presents a series of audible questions to the consumer that pertain to a subject media content event that the consumer has previously consumed. Responses of the consumer to each one of the presented audible questions of the query session are acquired and are saved.

12 Claims, 2 Drawing Sheets

(56) References Cited

U.S. PATENT DOCUMENTS

| | | | |
|---|---|---|---|
| 2012/0130806 A1* | 5/2012 | Partridge | G06Q 30/0251 705/14.49 |
| 2012/0330721 A1* | 12/2012 | Volpe | G06Q 30/0202 705/7.32 |
| 2014/0067395 A1* | 3/2014 | Balasubramanian | G06Q 30/0255 704/251 |
| 2014/0150004 A1* | 5/2014 | Vemparala | H04N 21/44222 725/13 |
| 2016/0127796 A1* | 5/2016 | Wuchter | H04N 21/4532 725/34 |
| 2017/0032389 A1* | 2/2017 | Grabarnik | G06Q 10/0635 |

* cited by examiner

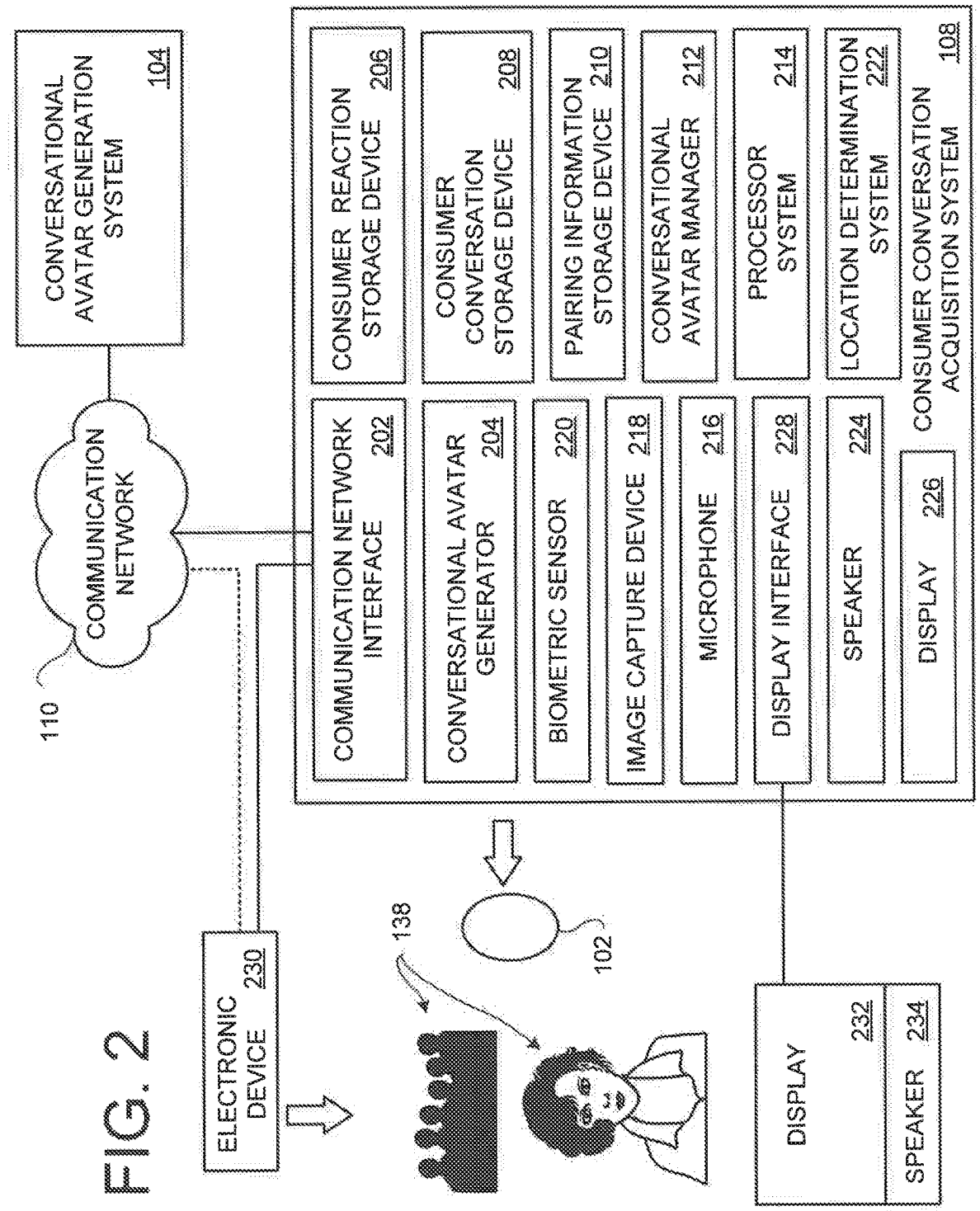

APPARATUS, SYSTEMS AND METHODS FOR ACQUIRING COMMENTARY ABOUT A MEDIA CONTENT EVENT

BACKGROUND

Media devices, such as a set top box, a stereo, a television, a computer system, a game system, or the like, are often configured to present a particular media content event to a user. Alternatively, a user may go to a theatre or the like to view (interchangeably referred to herein as consume) the media content event.

Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

Producers (interchangeably referred to herein as the "studio") of the media content events have limited access to their customers who have viewed their produced media content event (interchangeably referred to herein as a "consumer" who has "consumed" the media content event). Although various entities, such as movie critics or the like, provide opinion-based feedback to the studio concerning the reaction of the consuming viewers, the studio does not have direct access to these consumers.

Other sources of consumer feedback are available to the studio. For example, various social media platforms exist where consumers may discuss their opinions about a particular viewed media content event. However, the studio may not have access to such social media platforms. And, it may be difficult for the studio to monitor and then harvest options and commentary made by community members. Even if the studio could access individual consumers and obtain their opinion about a viewed media content event, accessing and obtaining information from hundreds of, or even thousands of, individual consumers is a very difficult and time consuming endeavor.

Additionally, prior to and/or after viewing a particular media content event, the consumer may wish to hear the opinions of other consumers. In many instances, an individual consumer has access to media content event reviews that have been generated by other entities. Alternatively, or additionally, they may access a social media platform to obtain opinions about the media content event that have been provided by the community members of the social media platform. However, this is also a difficult and tedious task for an individual consumer.

Further, the studio and/or consumer, when accessing an opinion of another consumer, may not know if they are receiving a genuine and honest opinion about the media content event. Nor will they know if the opinion is representative of a general consensus by a larger population of consumers. And, accessing and digesting a large number of opinions for many different consumers to identify genuine, honest and representative viewpoints cannot be practically be done in a real time, or near real time, basis.

Accordingly, there is a need in the arts to provide a user-friendly environment that facilitates the ability of the studio and/or an individual consumer to access an opinion about a consumed media content event that is genuine, honest and representative.

SUMMARY

Systems and methods of querying a consumer about a subject media content event are disclosed. An exemplary embodiment is operable to determine a current location of a consumer conversation acquisition system when the consumer conversation acquisition system is a mobile electronic device or determine a current operation of the consumer conversation acquisition system when the consumer conversation acquisition system is stationary. Stored state information corresponding to the determined location or operation is accessed that identifies one of a receptive state of the consumer, an unreceptive state of the consumer, or optionally an indeterminate state of the consumer. The query session is presented to the consumer when the consumer is the receptive state. A query session presents a series of audible questions to the consumer that pertain to the subject media content event that the consumer has previously consumed. Responses of the consumer to each one of the presented audible questions of the query session are acquired and are saved.

BRIEF DESCRIPTION OF THE DRAWINGS

Preferred and alternative embodiments are described in detail below with reference to the following drawings:

FIG. 2 is a block diagram of the consumer conversation acquisition system.

DETAILED DESCRIPTION

Figure 1:
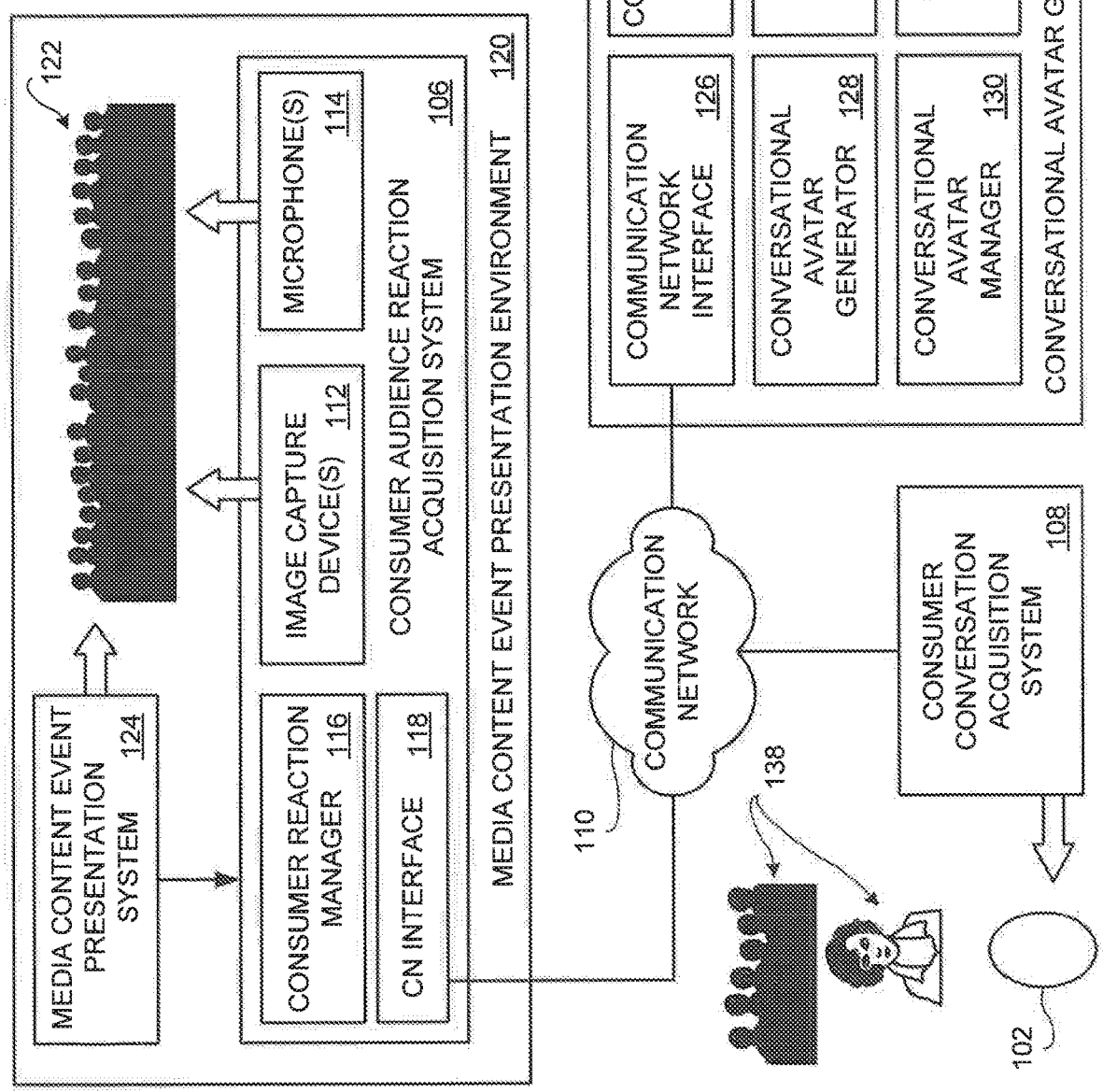
FIG. 1 is a block diagram of an embodiment of a conversational avatar system.

FIG. 1 is a block diagram of an embodiment of a conversational avatar system 100. A non-limiting example of the conversational avatar system 100 comprises a conversational avatar generation system 104, an optional consumer audience reaction acquisition system 106, and a consumer conversation acquisition system 108. The conversational avatar generation system 104, the consumer audience reaction acquisitions system 106, and the consumer conversation acquisition system 108 are communicatively coupled together via a suitable communication network 110.

In practice, embodiments of the conversational avatar system 100 are configured to conduct a "virtual conversation" with an individual (a consumer) who has viewed (consumed) a particular theme-based media content event to acquire their commentary about the media content event. The virtual conversation, interchangeably referred to herein as a query session, is conducted with the consumer by presenting an interactive conversational avatar 102 to the consumer. A novel aspect of the conversational avatar system 100 is that the query session is initiated when a determination is made that the consumer is highly likely to respond to the query session and/or interact with the interactive conversational avatar 102. When a determination is made that the consumer is not likely, or at least is somewhat likely, to respond to the query session and/or interact with the interactive conversational avatar 102, the query session is not initiated by the conversational avatar system 100. In the various embodiments, the determination of whether the consumer is likely to respond to the query session and/or interact with the interactive conversational avatar 102 is based on learning by a suitable artificial intelligence (AI) program that learns about the consumer state (wherein the consumer state is defined as being likely or unlikely to respond to the query session and/or interact with the interactive conversational avatar 102). The consumer state is determined based on, in part, a determined current location and/or activity of the consumer. A location activity is defined herein as an activity that the consumer has been engaged in while previously at that associated location During a query session, the conversational avatar 102 asks various questions and/or presents various comments pertaining to the subject media content event, a particular scene or event in the subject media content event, and/or a storyline that is presented in the subject media content event. By "asking" the consumer questions about the subject media content scene, event and/or story line, the consumer may express their opinions and viewpoints about the subject media content event. Similarly, by stating a comment about the subject media content event, the consumer may respond with their opinions and viewpoints that are related to the comment.

The consumer's opinions and viewpoints may be expressed as verbal commentary (interchangeably referred to herein as a verbal response) that is spoken by the consumer. Alternatively, or additionally, the consumer's opinions and viewpoints may be expressed as non-verbal actions made by the consumer. Non-limiting examples of non-verbal actions expressed by the consumer may include facial expressions (such as a smile that expresses satisfaction or happiness, a frown that expresses dissatisfaction or disappointment, a raised eyebrow that expresses a question or confusion, etc.) and/or a bodily gesture (such as hand waving that expresses excitement, a nodding of their head that expresses consent or agreement, clapping that expresses satisfaction or appreciation, etc.).

The expressed consumer opinions and viewpoints are acquired by the consumer audience reaction acquisition system 106 and/or the consumer conversation acquisition system 108, and are then communicated to the conversational avatar generation system 104 for processing. Over time, the opinions and viewpoints for many hundreds of consumers, or even thousands of consumers, can be acquired to identify genuine, honest and representative viewpoints about a subject media content event, a particular scene or event in the subject media content event, and/or a storyline that is presented in the subject media content event. A representative opinion and/or viewpoint can then be determined that is a genuine, honest and representative viewpoints of a population of consumers. This information can then be made available to the studio or another consumer.

In an example embodiment, consumer opinions and viewpoints may be acquired from one or more sources. The optional first source is to harvest (acquire) information from the consumer(s) while the consumer(s) is viewing (consuming) the subject media content event. The consumer audience reaction acquisition system 106 comprises one or more image capture devices 112, one or more microphones 114, a consumer reaction manager 116, and a communication network (CN) interface 118.

The consumer audience reaction acquisition system 106 may be located in a media content presentation environment 120, which may be any suitable public or private location. In one example implementation, the media content presentation environment 120 is a public theatre or the like where a plurality of consumers 122 are concurrently viewing the subject media content event that is being presented to them by a media content event presentation system 124. Here, the media content event presentation system 124 may be a theatre projection system that presents the video (visual) portion of the subject media content event on a large screen or display that is concurrently viewable by an audience. The audio portion of the subject media content event may be presented using a plurality of speakers that emit sound that is heard by the audience.

In a theatre-based media content presentation environment 120, a plurality of image capture devices 112, commonly known as cameras, capture (acquire) a video or a series of still images of the audience 122 and/or of one or more individual consumers 122. The microphone(s) 114 capture (acquire) sounds that are present in the media content presentation environment 120. The captured images and sounds are saved (recorded) into a suitable memory medium so that recorded video consumer actions and recorded sounds can be time-wise synchronized together. The recorded video and audio information are time synchronized together using any suitable time reference(s). Thus, if the audience 122 reacts to presentation of a particular scene or event, their verbal commentary can be acquired by the microphone(s) 114 and their non-verbal reactions can be acquired by the image capture device(s) 112.

The media content event presentation system 124 is in communication with the consumer reaction manager 116. The media content event presentation system 124 communicates presentation time information that identifies when particular portions of the subject media content event are being presented to the audience 122. Presentation time information for the presentation of particular scenes, events, or story lines of the subject media content event is then time synchronized with the recorded video and/or audio information that is acquired from the audience 122.

Any suitable presentation time information may be used for time synchronization of the presented subject media content event and the video and/or audio information acquired from the audience 122. For example, but not limited to, presentation time stamps, scene identification information and/or other meta data embedded in the subject media content event, may be used for time synchronization purposes. Alternatively, or additionally, real-time information from a clock (not shown) may be used for time synchronization (where a clock time is used to define a presentation time of a particular portion of the presenting subject media content event, and where the same clock time is associated with the acquired video and/or audio reaction of the audience).

The consumer reaction manager 116 then communicates the acquired time synchronized video, audio, and scene/event/story line information, via the communication network interface 118 that is communicatively coupled to the communication network 110, to the conversational avatar generation system 104. The communication network interface 118 may be any suitable wireless or wire-based interface that communicatively couples the consumer audience reaction acquisition system 106 to the communication network 110.

The communication network 110 is illustrated as a generic communication system. In one embodiment, the communication network 110 comprises a cellular telephone system, such as a radio frequency (RF) wireless system. Accordingly, the communication network interface 118 includes a suitable transceiver device (not shown) that communicated information wirelessly or over a wire-based connector to the communication network 110. Alternatively, or additionally, the communication system 156 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 104 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 104 may be configured to communicate over combination systems having a plurality of segments which employ different formats for each segment that employ different technologies on each segment.

The example conversational avatar generation system 104 comprises a communication network interface 126, a conversational avatar generator 128, a conversational avatar manager 130, a consumer and audience reaction storage device 132, a consumer conversation storage device 134, and a media content event (MCE) scene, event, and story line storage device 136. In some embodiments, the storage devices 132, 134 and/or 136 are integrated together as a single storage device, and/or are integrated with other storage deices that store other information. In some embodiments, the conversational avatar generator 128 and the conversational avatar manager 130 may be integrated together, and/or may be integrated with other logic. Other conversational avatar generation systems 104 may include some, or may omit some, of the above-described media processing components. Further, additional components not described herein may be included in alternative embodiments. The communication network interface 126 may be similar to, or even that same as, the above-described communication network interface 116.

In the context of this specification, the storage devices include a "computer-readable medium" that can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). The computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Further, the storage device mediums may be commonly located, may include a plurality of memory mediums commonly located, and/or may include a plurality of memory mediums that are distributed among different locations.

In the various embodiments, the conversational avatar generation system 104 then receives the time synchronized video, audio, and scene/event/story line information, (via the communication network interface 118 that is communicatively coupled to the communication network 110) from the consumer audience reaction acquisition system 106. The conversational avatar generation system 104 stores the received time synchronized video, audio, and scene/event/story line information for the subject media content event (which is identified by a suitable identifier of the associated subject media content event) in the consumer and audience reaction storage device 132. This information may then be later processed to identify a representative opinion and/or viewpoint that can then be determined to be genuine, honest and representative viewpoints of a population of consumers 122.

In some situations, the reaction of one or more consumers viewing the subject media content event may be obtained at a private location. For example, one or more consumers may be viewing the subject media content event at their home or residence. Here, the media content event presentation system 124 may include a set top box (STB), stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream. In some embodiments, the consumer audience reaction acquisition system 106 may be a stand-alone device that is communicatively coupled to one or more components of the media content event presentation system 124. Alternatively, the consumer audience reaction acquisition system 106, or even one or more the components thereof, may be integrated into one or more of the components of the media content event presentation system 124.

Another source of opinions and viewpoints of the consumers of the subject media content event is to acquire (harvest) verbal responses during one or more "conversations" with an individual consumer 138 or a relatively small group of individual consumers 138. Optionally, non-verbal responses may also be acquired.

To acquire the opinions and viewpoints of the consumer 138, the individual consumer 138 or the relatively small group of individual consumers 138 are presented with a query session after they have consumed the subject media content event. A query session comprises a series of questions and/or comments presented by the conversational avatar 102. The individual consumer 138 or the relatively small group of individual consumers 138 are collectively referred to herein as the "consumer 138" for convenience. Presentation of the query session and the harvesting of the response of the consumer 138 is managed by the consumer conversation acquisition system 108.

In practice, the series of questions and/or comments are initially constructed by the studio or a studio representative who is familiar with the questions and the issues that the studio wishes to explore with a consumer 138 during a query session for a particular media content event. Accordingly, a series of query session questions and/or comments are developed for many different media content events. Alternatively, or additionally, query session questions and/or comments may be developed for a scene, an event and/or a story line of a particular media content event. When the subject media content event is one of the plurality of media content events for which a query session has been defined, then the stored series of questions and/or comments can be accessed for presentation to the consumer 138. One skilled in the art appreciates that then number of questions and/or comments for any particular media content event, which may even be directed to a particular scene, event and/or a story line, are nearly limitless. Further, artificial intelligence (AI) system may be used to augment, revise and/or generate new questions and/or comments based on input from the audience 122 and/or from other consumers 138. The generated query session questions and/or comments are associated with a media content event, and optionally one or more of a scene, an event and/or a story line of the media content event, and are then saved at the conversational avatar generation system 104, such as in the media content event scene, event, and story line storage device 136 or in another suitable storage medium.

Further, the identity of a particular consumer 138 participating in a query session is known. Preferably, the identifier of the consumer conversation acquisition system 108 is associated with the name, account number, or other identifier of the consumer 138. Any suitable means may be used to identify the particular consumer 138.

Further, in some situations, the particular consumer 138 may have been observed when they were a member of the audience 122 and/or when they consumed the subject media content event on another media presentation device. For example, the consumer 138 may have made a particular verbal and/or nonverbal response to a particular presented scene, event and/or a story line of the subject media content event during its presentation. Here, the time of reaction of the consumer is correlated with the presentation time of the scene, event and/or story line of interest. Embodiments may then optionally select query session questions and/or comments that correlate the observed reactions of the consumer 138 such that a particular series of questions and/or comments may be presented during the query session to learn more about why the consumer 138 reacted to particular scenes, events and/or a story lines of the subject media content event.

To facilitate interaction between the consumer conversation acquisition system 108 and the consumer 138 during a query session, the conversational avatar generation system 104 presents an interactive and "intelligent" conversational avatar 138 that is able to dynamically interact with the consumer 138. The conversational avatar 138, during a query session, presents the series of questions and/or provides comments that are intended to elicit a response from the consumer 138 during the query session. In practice, multiple query sessions over time may be conducted with a consumer 138. In some situations, individuals in the relatively small group of individual consumers 138 may be different from one query session to the next query session. In some embodiments, identity information for the queried individual consumer 138 or individuals of the relatively small group of individual consumers 138 may be optionally obtained and saved with their opinions and viewpoints.

In some situations, the conversational avatar 102 is an interactive graphical avatar that has a visual portion that is presented on a display (not shown) and that has an audio portion that is presented from speakers. Here, the consumer 138 may then interact with a visual type of graphical-based avatar that is asking them questions, that is making verbal comments, and/or that is presenting non-verbal queues (such as making facial expressions, making hand gestures, or the like). The display may be, for example, a monitor a or television display that presents a two-dimensional, conversational avatar 102. In other situations, the conversational avatar 102 may be presented busing a virtual reality presentation system that presented a virtual world conversational avatar 102 in two dimensions or even in three dimensional space.

In other situations, the conversational avatar 102 is presented as an audio-only avatar (interchangeably referred to herein as an audio bot). Here, the avatar audio bot presents audible questions and/or comments from a speaker that emits sounds that are heard by the consumer 138.

As defined herein, the conversational avatar 102 may be a graphical-based avatar with video and audio portions, or may be an avatar audio bot with only an audio portion, depending upon the nature of the particular query session being conducted with the consumer 138. The conversational avatar 102, in FIG. 1, is conceptually represented as a white fill oval for convenience.

In practice, embodiments have a priori knowledge of the plurality of media content events that have been consumed by the consumer 138. Knowledge of which particular media content event that have been consumed may be obtained from a variety of sources. For example, theatre ticket purchase information may be obtained for the consumer 138. A subscription-based service (such as available through a satellite or cable type content delivery service) may provide viewing information about the consumer 138. In some situations, activity of the consumer 138 in a social media community may be monitored to identify consumed media content events. Alternatively, or additionally, the consumer 138 may specify their consumed media content events to the conversational avatar system 100, such as by providing input through their consumer conversation acquisition system 108 or another suitable electronic device.

Based on the priori knowledge of consumed media content events, and based on what the interest is on the part of the studio or another entity, the subject media content event is identified. Then, since query session questions and/or comments are associated with a particular media content event, the query session questions and/or comments associated with the subject media content event can be accessed from the conversational avatar generation system 104 and may be communicated to the consumer conversation acquisition system 108 for presentation during the query session. That is, for a selected media content event (interchangeably referred to herein as the subject media content event), a plurality of questions and/or comments pertaining to the subject media content event (or even a particular scene, event and/or story line of the subject media content event) are accessed for presentation to the consumer 138 during the query session.

During a query session, the consumer conversation acquisition system 108 acquires (harvest) the audible/verbal responses of the consumer 138 to the query questions and/or to the query comments using a microphone or similar sound detecting device. Optionally, non-verbal responses of the consumer 138 may be acquired during the query session using a suitable image capture device.

The acquired responses are then communicated from the consumer conversation acquisition system 108 to the conversational avatar generation system 104. The received responses are stored into the consumer conversation storage device 134 for later processing.

Additionally, each question and/or comment presented by the conversational avatar 102 is associated with at least one of a scene, an event and/or a story line of the subject media content event. For example, the conversational avatar 102 may verbally ask the consumer 138 "did you like the first kiss between the characters John Smith and Jane Doe?" Here, the scene that presented the first kiss would be known (and identifiable with a particular identifier). Alternatively, or additionally, the story line associated with the first kiss would be known (and identifiable with a particular identifier). Or, the precise presentation time or duration of the first kiss would be known (and identifiable with a particular identifier). Accordingly, in this simplified hypothetical example, the question presented by the conversational avatar 102 is associated with a particular scene, event and/or story line of the subject media content event (by associating the question or remark with the particular identifier of the scene, event and/or story line).

The consumer 138 may verbally respond to the query session question by saying that they thought the first kiss was very romantic. Alternatively, the consumer 138 may smile and/or sigh, indicating some degree of satisfaction with the character's first kiss (which may be reasonably inferred from their non-verbal response). The response of the consumer 138 is then associated with an identifier of the particular question and/or comment presented by the conversational avatar 102. For example, the identifier may be "first kiss" or some other suitable alpha-numeric identifier, which is then associated with the acquired consumer response and/or reaction. Further, this information may be associated with an identifier of the subject media content event.

Alternatively, or additionally, since a time stamp, scene identifier, or other relevant meta data of the subject media content event has been associated with the question and/or comment made by the conversational avatar 102, the response of the consumer 138 may then be associated with the same particular scene, event and/or story line of the subject media content event (by associating their response with the particular identifier of the scene, event and/or story line). For example, the time stamp, meta data, scene identifier and/or story line identifier associated with the query question and/or to the query comment, is accessed and is then associated with the consumer's response and/or reaction.

Various supplemental information for the scenes, events and/or story lines of the subject media content event may be stored in the MCE scene, event, and story line storage device 136. As the responses of the consumer 138 are received during a query session, the supplemental information may then be associated with the particular scene, event and/or story line that has been associated with the question and/or comment presented in the query session. Alternatively, or additionally, the supplemental information may be associated with the response received from the consumer 138. Accordingly, the "richness" (the amount and quality) of the information pertaining to a particular response of the consumer 138 to a particular scene, event and/or story line of the subject media content event is enhanced.

The conversational avatar 102 is an interactive graphical-based avatar or an audio only avatar bot that interactively presents the series of questions and/or comments to the consumer 138 during a query session. The conversational avatar generator 128 manages generation of the conversational avatar 102 that is presented to the consumer 138. In some embodiments, the conversational avatar generator 128 is an optional component, and is alternatively implemented in the consumer conversation acquisition system 108.

Since the conversational avatar 102 is interacting with the consumer 138 in an intelligent fashion, a next presented question and/or comment may be determined on a real-time basis, or near real-time basis, based on the response of the consumer 138 to a previously presented question and/or comment. Further, since the conversational avatar manager 130 interactively selects particular questions and/or comments for presentation to the consumer 138 during the query session (where the conversational avatar generator 128 generates the conversational avatar 102 for presentation), a suitable artificial intelligence (AI) system may be used to process and analyze the reactions of the consumer 138.

The selection or definition of particular questions and/or comments, and their order of presentation, used during a query session may be based on a plurality of different factors. For example, a next follow-up question or comment may be based on a past response of the consumer 138 to a previous question and/or comment associated with a particular scene, event and/or story line of the subject media content event. For example, returning to the above-described simplified hypothetical example of the first kiss between characters, the consumer 138 may have expressed some degree of satisfaction or happiness. The conversational avatar manager 130 may then define a new follow-up question related to the subject matter of the previous question such as "why did you like the first kiss between the characters?" As another example, the conversational avatar manager 130 may define a comment that states that "the first kiss was an essential element of the current story line." Conversely, the consumer 138 may have expressed some degree of dissatisfaction or disappointment. The conversational avatar manager 130 may then define a new follow-up question such as "why didn't you like the first kiss between the characters?" As another example, the conversational avatar manager 130 may define a follow-up comment that states that "the first kiss did not seem to be related at all to the current story line." Here, the conversational avatar generator 128 is defining a next follow-up question and/or comment. The follow-up question and/or comment is intended to elicit continued conversation with the consumer 138 pertaining to the associated scene, event and/or story line of the subject media content event. That is, the next question and/or comment is defined with the intent of generating further responses from the consumer 138 that are associated with the previous question and/or comment.

As another example, the next question or comment may be based on a different media content event that has been associated with the subject media content event and that is known to have been viewed by the consumer 138. Here, the next question and/or comment may be based on a correlation between the particular scene, event and/or story line of the subject media content event that is being discussed with a corresponding scene, event and/or story line of the previously consumed media content event. In this situation, the supplemental information associated with a particular scene, event and/or story line of the subject media content event is correlated with supplemental information from the various events, scenes, and/or story lines of the previously consumed media content event. When a correlation is found, then the next question or comment may be made with reference to the associated scene, event and/or story line.

As another example, the next question or comment may be based on past responses of other consumers 138. Returning to the above-described simplified hypothetical example of the first kiss between characters, a majority of other individual consumers 138, the relatively small group of individual consumers 138, and/or the audience 122 may have previously indicated a relatively high degree of satisfaction or happiness towards the first kiss. However, the consumer 138 may have expressed some degree of dissatisfaction or disappointment. The conversational avatar manager 130 may then determine that the consumer's comment and/or reactions is not consistent or is contrary to the general consensus, and then define a new question and/or remark further exploring the consumer's opinion and viewpoint that were expressed in response to the query question and/or to the query comment. For example, a next query question may be determined such as "many others who viewed the subject media content event really liked the first kiss. Why didn't you like the first kiss between the characters?" Here, the combination of a query remark followed by a query question is defined with an intent to elicit the reasoning behind the dislike or disappointment experienced by the consumer 138.

As another example, the next question or comment may be based on a currently determined location and/or activity of the consumer 138. Here, the current location may be determined to be related to or associated with a particular media content event. For example, the scene the particular media content event may have been filmed at a set location that is the same as the currently determined location. Here, a query session discussing that scene may result in a higher level of participation on the part of the consumer 138 since that are at the same location as where the scene was filmed. To implement this feature, a current location is compare with locations associated with one or more media content events. When the current location of the consume matches with an associated location, then questions and/or comments associated with that scene are accessed and are then used to generate a query session that is presented to the consumer 138 while at that location.

As another example, the current activity of the consumer may be determined to be driving a car. Questions and/or comments relating to driving are accessed for the subject media content event. Then, the query session may be constructed so as to present questions and/or comments pertaining to particular scenes, events, or story lines of the subject media content event pertaining to driving.

In some situations, personal information about the consumer 138 may be accessed to determine questions and/or comments for a query session. Here, query session questions and/or comments can be specifically defined that are more personal in nature to the consumer 138. Such personalized questions and/or comments are likely to increase the involvement of the consumer 138 in the ongoing query session, and result in more personal and meaningful responses.

Further, the personal experiences of the consumer 138 may be used to improve the recollection of the consumer 138 to particular scenes, events, or story lines of the subject media content event. Here, a listing of experiences of the consumer 138 are collected and are maintained by the conversational avatar system 100. Prior to initiation of the query session, or during an ongoing query session, these personal experiences of the consumer 138 are compared with attributes, characteristics, or descriptions of particular scenes, events, or story lines of the subject media content event. When a particular experience of the consumer 138 matches with or correlates to with a particular scene, event, or story line, a query session question and/or comment can then be constructed that includes a description of the experience of the consumer 138. When this personalized experience information is included as part of the query session, the involvement by the consumer 138 is likely to increase and result in more meaningful and personal responses.

In some situations, a famous quote or saying may be incorporated into a query session that is well known to the consumer 138 and/or that has been identified as a favorite of the consumer 138. A recognizable quote, when incorporated into a query session question and/or comment, is likely to increase the involvement of the consumer 138 in the ongoing query session, and result in more personal and meaningful responses. Such quotes may be obtained from the dialogue of particular scenes, events, or story lines of the subject media content event.

Music may also be incorporated into a query session to increase the involvement of the consumer 138 in the ongoing query session, and result in more personal and meaningful responses. Such music, when presented during the query session, may invoke an emotional response form the consumer 138. Accordingly, their response to a particular query session question and/or comment during presentation of the music may be more relevant and sincere. Music from particular scenes, events, or story lines of the subject media content event may be used in the query session. Alternatively, any music may be used in a query session. In some instances, such as music identified in a favorites list of the consumer 138 may be selected for presentation during a query session. Additionally, or alternatively, music known to evoke particular emotions in a listener may be selected for presentation during a query session.

One skilled in the art appreciates that the series of questions and/or comments presented in a query session are limitless. Further, it is likely that the query session presented to a first individual consumer 138 or a first relatively small group of individual consumers 138 is likely to be different from a query session presented to a different second individual consumer 138 or a second relatively small group of individual consumers 138. The changing and developing lines of presented questions and/or comments are defined to further harvest more genuine, honest and representative viewpoints from a current query session with the individual consumer 138 or the relatively small group of individual consumers 138.

In the various embodiments, the interactive conversational avatar 102 is generated by the conversational avatar generator 128 under the management of the conversational avatar manager 130. The conversational avatar manager 130 also manages the processing and storing of responses from the consumer 138, determines a next question and/or comment to be made during the query session, and associates supplemental information with a question, a comment and/or a received response. In some embodiments, the conversational avatar manager 130 and/or the conversational avatar generator 128 may be implemented as components of the conversational avatar generation system 104, as illustrated in FIG. 1. In alternative embodiments, the conversational avatar manager 130 and/or the conversational avatar generator 128 may be implemented as components of the consumer conversation acquisition system 108.

In an example embodiment, the consumer conversation acquisition system 108 is implemented as a stand alone electronic device. In other embodiments, the consumer conversation acquisition system 108 may be implemented in a suitable media device or as a component of a media presentation system 124. In other embodiments, the consumer conversation acquisition system 108 may be implemented as part of a set top box (STB), a stereo, a surround-sound receiver, a radio, a television (TV), a digital video disc (DVD) player, a digital video recorder (DVR), a game playing device, a personal computer (PC), a cellular phone, a smart phone, a personal computer, a laptop computer, a personal device assistant (PDA), or even within a virtual reality head mounted display HMD. One skilled in the art appreciates that the consumer conversation acquisition system 108 may be implemented in any electronic device now known or later developed that is capable of presenting a series of questions and/or comments to a consumer 138, and that is capable of acquiring the response of the consumer 138 to the presented series of questions and/or comments.

FIG. 2 is a block diagram of the consumer conversation acquisition system 108. The consumer conversation acquisition system 108 comprises a communication network interface 202, a conversational avatar generator 204, an optional consumer reaction storage device 206, an optional consumer conversation storage device 208, an optional pairing information storage device 210, a conversational avatar manager 212, a processor system 214, at least one microphone(s) 216, at least one optional image capture device(s) 218, one or more optional biometric sensors 220, an optional location determination system 222, at least one speaker 224, an optional display 226, and an optional display interface 226. Embodiments of consumer conversation acquisition system 108 may be implemented in various types of media devices, such as, but not limited to, a set top box, a stereo, a surround-sound receiver, a radio, a television (TV), a digital video disc (DVD) player, a digital video recorders (DVR), a cellular phone equipped with video functionality, a personal device assistants (PDA), a game playing device, or any type of personal computer (PCs). The consumer conversation acquisition system 108 is configured to present a video-based and/or an audio-only conversational avatar 102 to the consumer that present query questions and/or to the query comments during a query session. Further, the consumer conversation acquisition system 108 is configured to acquire (harvest) the consumer's opinions and viewpoints that are expressed in response to a presented query question and/or a query comment.

In some embodiments, the conversational avatar generator 204 and/or the conversational avatar manager 212 may be integrated together, and/or may be integrated with other logic. In other embodiments, some or all of these memory and other data manipulation functions may be provided by using a remote server or other electronic devices suitably connected via the Internet or otherwise to a client device. Other consumer conversation acquisition systems 108 may include some, or may omit some, of the above-described media processing components. Further, additional components not described herein may be included in alternative embodiments such that the consumer conversation acquisition system 108 is able to perform other functionality.

The communication network interface 202 is configured to communicatively couple the consumer conversation acquisition system 108 to the conversational avatar generation system 104 via the communication network 110. The communication network interface 202 may be any suitable wireless or wire-based interface that communicatively couples the consumer conversation acquisition system 108 to the communication network 110. Information acquired by the microphone 216 and/or the image capture device 218 is communicated to the conversational avatar generation system 104. Further, information controlling the presentation of the conversational avatar 102 may be received from the conversational avatar generation system 104 at the communication network interface 202.

The optional image capture device(s) 218, commonly known as a camera, captures (acquires) a video or a series of still images of the individual consumer 138 or a relatively small group of individual consumers 138. The microphone(s) 216 capture (acquire) sounds that are present in proximity to the individual consumer 138 or a relatively small group of individual consumers 138. The biometric sensor 220 acquires biometric information (interchangeably referred to herein as a physical response) from the consumer 138. The captured images, sounds and/or biometric information are saved (recorded) into a suitable memory medium. The recorded images, sounds and/or biometric information are time-wise synchronized together. The recorded images, sounds and/or biometric information may be synched together in time using any suitable process and/or any suitable time reference(s). Thus, if the consumer 138 reacts to presentation of a particular query question and/or to a query comment, their verbal commentary can be acquired by the microphone(s) 216 and their non-verbal reactions can be acquired by the image capture device(s) 218 and/or the biometric sensor(s) 220, and then be associated with the particular query question and/or to a query comment that elicited the consumer's response.

In some embodiments, the consumer's audible response (spoken words, etc.) acquired by the microphone(s) 216 is stored as audio information in the consumer conversation storage device 208 over the duration of a query session. Upon completion of the query session, or a portion thereof, the stored audio information is communicated to the conversational avatar generation system 104 (which may then be stored in the consumer conversation storage device 134). If acquired, the consumer's non-verbal response (gestures, etc.) acquired by the image capture device(s) 218 and/or any biometric response acquired by the biometric sensor(s) 220 is stored as video, image and/or biometric information in the consumer reaction storage device 206 over the duration of a query session. Upon completion of the query session, or a portion thereof, the stored video information is communicated to the conversational avatar generation system 104 (which may then be stored in the consumer conversation storage device 134). In some embodiments, the storage devices 206 and 208 (and/or 210) are integrated together as a single storage device, and/or are integrated with other storage deices that store other information.

In some embodiments, the consumer conversation acquisition system 108 and the conversational avatar generation system 104 are communicatively coupled together during a query session. During the duration of the query session, the consumer's opinions and viewpoints (acquired as audio information, as video or image information, and/or as biometric information) are communicated from the consumer conversation acquisition system 108 to the conversational avatar generation system 104 on a real time basis (or on a near real time basis). Accordingly, the optional consumer conversation storage device 208 and/or the optional consumer reaction storage device 206 may be omitted from that embodiment.

The optional conversational avatar generator 204 generates the conversational avatar 102 for presentation to the consumer 138. If the consumer conversation acquisition system 108 is an audio-only type device, then the conversational avatar generator 204 generates the verbal query questions and/or the query comments that are presented to the individual consumer 138 or a relatively small group of individual consumers 138. The audible query questions and/or the query comments are reproduced as sounds by the speaker(s) 224. If the consumer conversation acquisition system 108 is a video and audio based device, then the conversational avatar generator 204 generates the verbal query questions and/or to the query comments that are presented to the individual consumer 138 or a relatively small group of individual consumers 138 by speakers 224 or 234, and concurrently generates a video of the animated graphical conversational avatar 102 that is presented to the individual consumer 138 or a relatively small group of individual consumers 138 on a suitable display 232. That is, the animated graphical conversational avatar 102 appears to speak the words of the presented series of audible questions to the consumer that pertain to the subject media content event.

The optional one or more biometric sensors 220 may be included to acquire biometric information from the individual consumer 138 or a relatively small group of individual consumers 138 as they respond to particular query questions and/or to the query comments. Example biometric sensors 220 include, but are not limited to, heart rate sensors that can be used to determine changes in heart beat rates, blood pressure sensors that can be used to determine changes in blood pressure, body temperature sensors that can be used to sense body temperature changes such as on the skin surface, moisture sensors that can be used to detect perspiration, and/or electroencephalography (EEG) sensors that employ an electrophysiological monitoring method to detect and/or record changes in electrical activity of the brain. Changes is such detected biometric states of the individual consumer 138 or a relatively small group of individual consumers 138 may be used to determine whether the response to query questions and/or to the query comments are truthful, genuine, honest and/or representative.

Further, some embodiments may use the biometric information to determine the emotional state of the consumer 138. Such emotional state information may also be used to verify the truthfulness, genuineness, and/or honesty of the response of the consumer 138 to particular query questions and/or to the query comments. Further, the biometric information may be used to determine the degree of emotional response that the consumer 138 is experiencing when they hear a query question and/or the query comment, and/or when they reply with their response.

One skilled in the art appreciates that interacting with the consumer 138 and obtaining their response to presented query questions and/or to query comments about a particular media content event is problematic at best. In many situations, the consumer 138 is occupied with tasks that prevent their interaction with the conversational avatar 102. In such situations, the consumer 138 may be defined to be in an unreceptive state. In other situations, also defined as an unreceptive state, the consumer 138 may simply not wish to interact with a presented conversational avatar 102.

On the other hand, there may be situations that the consumer 138 is willing to readily interact with a presented conversational avatar 102, defined as being in a receptive state. Here, the consumer 138 may not be preoccupied with a particular task or activity, or be at a location that is suitable for conducting a query session, and would therefore be willing to participate in a query session.

In yet other situations, even though the consumer 138 is not disposed to interact with a presented conversational avatar 102, defined as being in an indeterminate state. Here, the consumer 138 may be enticed or may become otherwise inclined to interact with a presented conversational avatar 102 (thereby transitioning to the receptive state). Alternatively, after some interaction with the conversational avatar 102, the consumer 138 may transition into the unreceptive state. Embodiments of the conversational avatar system 100 are configured to determine when a query session is initiated with the consumer 138.

One skilled in the art appreciates that determining "when" to initiate a query session with a particular consumer 138 is a task that is not possible to perform using today's state of the art technology. That is, there is simply no known way to determine when a query session should be initiated with a consumer 138. If a query session is initiated at a random time, the consumer 138 may or may not be willing to participate in the query session. More particularly, the consumer 138 is most likely to not want to participate in a query session if the consumer 138 in preoccupied with a particular task or activity and does not want to be disturbed by the query session.

To facilitate a determination of "when" to initiate a query session with a consumer 138, embodiments of the conversational avatar system 100 are configured to determine a state of the consumer 138 (with respect to whether or not the consumer 138 is in a receptive state and willing to participate in a query session, an unreceptive state and not willing to participates in a query session, or optionally in an indeterminate state where the consumer 138 might become interested in participating in a query session) during a particular activity. A query session is initiated when a determination is made that the consumer 138 is in the receptive state during the associated activity, and is therefore highly likely to respond to and participate in the query session and/or interact with the interactive conversational avatar 102. Conversely, when a determination is made that the consumer 138 is in the unreceptive state during the associated activity, and is therefore not likely to respond to the query session and/or interact with the interactive conversational avatar 102, the query session is not initiated by the conversational avatar system 100. Some embodiments are optionally configured to communicate a query session invitation when a determination is made that the consumer 138 is in the indeterminate state during the associated activity, and might be willing to respond to and participate in the query session and/or interact with the interactive conversational avatar 102.

In the various embodiments, the determination of whether the consumer 138 is likely to respond (that is, the consumer 138 is in the receptive state) or not respond (is in the unreceptive state) to the query session and/or interact with the interactive conversational avatar 102 is based on learning by a suitable artificial intelligence (AI) program that learns about the consumer state (receptive state and willing to participate in a query session, an unreceptive state and not willing to participates in a query session, or optionally in an indeterminate state) during the associated event. An event herein is defined by to be a location and/or an activity that is associated with a consumer state.

With respect to a current location of the consumer 138, the optional location determination system 222 is configured to determine a current location of the consumer conversation acquisition system 108. Here, if the location of the consumer 138 is changing or has changed to a current location, the determination of a current location is considered to be related to an event for that consumer 138 (that is, if the consumer 138 is moving or has moved, being at the location is considered as an event). Assuming that the consumer conversation acquisition system 108 is in the physical possession of the consumer 138, or is in near proximity to the consumer conversation acquisition system 108, the current location of the consumer conversation acquisition system 108 will be the same as, or correspond to, the current location of the consumer 138. Embodiments of the conversational avatar system 100 may associate one or more particular locations with a receptive state (that indicates that the consumer 138 is likely to respond to query questions and/or to the query comments). Other locations may be associated with the unreceptive state (that indicates that the consumer 138 is not likely to respond).

It is appreciated by one skilled in the art that when the conversational avatar system 100 is initiated for a new consumer 138, there will be no stored event/state parings. Locations of the consumer 138 are monitored. Also, activities that the consumer 138 is participating in are determined for the various monitored locations. At some juncture, particular activities will be encountered which are known to be the types of activities that the user is likely to be interested in participating in a query session. Here, the consumer 138 is presented with a query session invitation which may be presented as an audible question or queue, and/or which may be presented as a visual question and/or queue. Over time, if the consumer 138 has participated in a query session at that location, then that particular location is associated with the receptive state. Conversely, if the consumer 138 has not participated in a query session at that location, then that particular location is associated with the unreceptive state. Activities may be similarly associated with a state of the consumer 138.

If the indeterminate state is used as with some embodiments, some locations may be associated with the indeterminate state (that indicates that the consumer 138 may or may not become motivated to transition to the receptive state). Over time, if the consumer 138 has sometimes participated in a query session at that location, and at other times the consumer 138 has not participated in a query session at that location, then that particular location is associated with the indeterminate state. Here, the consumer 138 is presented with a query session invitation which may be presented as an audible question or queue, and/or which may be presented as a visual question and/or queue.

The consumer 138 may accept the query session invitation. In response to the acceptance by the consumer 138, a determination is made that the consumer 138 is in a receptive state. Therefore, the presentation of a query session is initiated. Alternatively, the consumer 138 may decline the invitation. Accordingly, a determination is made that the consumer 138 is in an unreceptive state. Therefore, the presentation of a query session is not initiated. For example, the query session invitation may audibly state "would you like to discuss movie XYZ?" (or by stating some other invitation related audible statement). If the consumer 138 responds by stating "yes" (or by indicating an acceptance of the invitation in other suitable manner), presentation of the query session is initiated. That is, their acceptance of the invitation corresponds to a transition from the indeterminate state to the receptive state. Conversely, if the consumer 138 responds by stating "no" (or by indicating their declining of the invitation in other suitable manner), presentation of the query session is not initiated. That is, their declining of the invitation corresponds to a transition from the indeterminate state to the unreceptive state.

A query session invitation may also be presented visually on the display 232 or another suitable display 226 (that is incorporated as a component of the consumer conversation acquisition system 108). The visual queue may be a simple iconic symbol known to the consumer 138 to be associated with a query session invitation. Alternatively, or additionally, the visual queue may be an object, person, or animated character that is overlaid on the currently presenting image shown on the display 226, 232. For example, if the consumer 138 is talking or texting on their cellular phone that is implemented with an embodiment of the consumer conversation acquisition system 108, a simple icon would inform the consumer 138. The consumer 138 could accept the query session invitation by actuation one of the actuators (push button keys) on their device. Alternatively, the consumer 138 could decline the query session invitation by actuating another actuator and/or by simply not responding (wherein after some predefined duration without a response from the consumer 138, a determination is made that the consumer 138 has declined the query session invitation).

As another example, the consumer 138 may be watching a television program on the display 232. Here, the current location of the consumer is known because the location of the display 232 is known (such as by a service address or account address of the consumer 138, and by the user of the display 232 to consume the television program). The icon associated with the query session invitation would then be inserted into or overlaid on top of the presented image (such as by using picture-in-picture technology or the like).

Alternatively, or additionally, a complex animated graphic could be inserted onto the display 232. For example, an animated character, actor or other person could be generated and overlaid over a portion of the display 232 to present the query session invitation. The consumer 138, upon seeing the animated character, actor or other person, would intuitively understand that they have received a query session invitation. The animated character, actor or other person might even replace a character, actor or other person being presented on the display 232.

In some instances, the audio portion of the presenting content may be modified such that the query session invitation is audibly indicated to the consumer 138 (from the speaker(s) 234 associated with the display 232) concurrently with the animated character portion of the conversational avatar 102. Accordingly, the animated conversational avatar 102 is perceived by the consumer 138 as "speaking" by the animated character, actor or other person.

An exemplary location determination system 222 employs a global positioning system (GPS) device that receives a plurality of satellite signals such that the current location is determined there from. The determined current location may be associated with a receptive state, an unreceptive state, or an indeterminate state. In practice, the determined current location is compared with previously determined location information that has been associated with one of the receptive state, an unreceptive state, or an indeterminate state. The associated state is accessed for the location that matches the determined current location, and the accessed state is used to define the current state for the determined current location. Any suitable GPS system now known or later developed may be used in the various embodiments. Over time, location information from the GPS may also be used to determine movement, a rate of speed of the movement, and/or a direction of travel.

Alternatively, or additionally, some embodiments may use a suitable triangulation system that detects a plurality of cellular tower transceivers. When multiple cellular towers are detected, the location of the consumer conversation acquisition system 108 may be estimated. The determined location may be associated with a receptive state, an unreceptive state, or an indeterminate state.

In practice, a currently determined location is compared with previously determined location information that has been associated with one of the receptive state, an unreceptive state, or an indeterminate state. The associated state is accessed for the location that matches the determined current location. Then, the accessed state is used to define the current state for the determined current location to determine if a query session should be initiated, or if a query invitation should be presented to the consumer 138.

Current location may be based on any suitable map or coordinate system. Further, such map systems may identify objects, such as buildings, roads and/or other features of the land that is then associated with the determined current location. Names of the buildings, roads and/or other features may be accessible from the map information, and/or may be based on the location information obtained from the map.

Accordingly, various location attributes may be associated with buildings, roads and/or other features. These buildings, roads and/or other features may, at some point in time, be in proximity to the determined location of the conversational avatar generation system 104. Such information is used to determine "when" to initiate a query session with the consumer 138. Here, the location attribute may be associated with a receptive state, an unreceptive state, or an indeterminate state. In practice, the determined current location is compared with previously determined location information and/or location attribute that has been associated with one of the receptive state, an unreceptive state, or an indeterminate state. The associated state is accessed for the location and/or location attribute that matches the determined current location, and the accessed state is used to define the current state for the determined current location.

Embodiments are configured to associate the state of the consumer 138 with a determined location based upon a computer-based AI learning process. Once a particular location has been associated with a particular state, the location information and the associated state information is saved into the pairing information storage device 210. Any suitable relational data base system may be used by the various embodiments. Over time, for any particular consumer 138, a database of different event/state pairings will be accumulated. The AI system may be used to intelligently manage the information of event/state pairing database that has been stored in the pairing information storage device 210. In some embodiments, the pairing information storage device 210 is omitted from the consumer conversation acquisition system 108, and is alternatively implemented at the conversational avatar generation system 104. Alternatively, both the conversational avatar generation system 104 and the consumer conversation acquisition system 108 may maintain the event/state pairing database in their respective pairing information storage devices 210. Such an implementation may be beneficial if the particular consumer 138 uses a plurality of different consumer conversation acquisition systems 108. Updates to the event/state pairing database of each device may be periodically or continuously performed so that each device has a most currently available event/state pairing database information.

The AI system may also associate a reliability value or factor that indicates the degree of relative certainty of the reliability of the information in the event/state pairing database. For example, if the consumer 138 has always been in the receptive state at a particular location for many times, and/or has been in a receptive state while participating in a particular activity, then a higher relative reliability value can be assigned to that and/or activity. In contrast, a lower reliability value may be assigned to a location and/or activity that has been infrequently visited, and/or when on occasion the consumer 138 is determined to be in the receptive state and at other times is determined to be in the unreceptive state. The reliability value (interchangeably referred to herein as a correlation factor) may be used to improve the reliability of the decision to initiate (or not to initiate) a query session based on the identification of the current location of the consumer conversation acquisition system 108 and/or based on a current identified activity that the consumer 138 is currently participating in. Further, over time as new information about the state of the consumer 138 with respect to various locations, attributes of the locations, and/or activity, the reliability value may be adjusted. Such reliability values may be associated with particular locations, particular location attributes, and/or activities. The reliability values are then saved with the particular locations, particular location attributes, and/or activities for later use when the consumer conversation acquisition system 108 is at or is near that location, at other locations with similar attributes, or is participating in the same or similar activities.

In practice, when the consumer conversation acquisition system 108 is a mobile type device, the current location of the consumer conversation acquisition system 108 is continuously or is periodically monitored. The current location is compared with locations residing in the event/state pairing database. When the current location matches one of the locations of the event/state pairing database, then for that location, the associated state is accessed from the event/state pairing database. The accessed state of the consumer 138 can be made to determine if a query session should be initiated, and/or if a query session invitation should be presented.

If a reliability value is used, then the reliability value may be compared with a reliability value threshold. If the reliability value exceeds a predefined reliability value threshold, then a reliable determination of the state of the consumer 138 is made. If the reliability value does not exceed a first reliability value threshold, but does exceed a different lower reliability value threshold, a query session invitation may be presented to the consumer 138. Different thresholds may be used for the various states of the consumer 138.

For a plurality of different locations, the consumer 138 may have always been willing, or at least often been willing, to interact with a presented conversational avatar 102 (defined herein as a receptive state location). Here, these different locations have been associated with the receptive state. When the current location is determined to be the same as, or substantially correspond to, one of those particular previously determined receptive state locations that the consumer 138 was willing to interact with a presented conversational avatar 102, then a query session will then be initiated.

Similarly, for a plurality of other locations, the consumer 138 may have always been unwilling, or at least often been willing, to interact with a presented conversational avatar 102 (defined herein as an unreceptive state location). For these locations, the unreceptive state is associated with those locations. When the current location is determined to be the same as, or substantially correspond to, one of those particular previously determined unreceptive state locations that the consumer 138 was unwilling to interact with a presented conversational avatar 102, then a query session will not be initiated.

For a plurality of other different locations, the consumer 138 may have been, on occasion, motivated to interact with a presented conversational avatar 102 in response to a query session invitation (defined herein as a indeterminate state location). The indeterminate state is associated with those locations. When the current location is determined to be the same as, or substantially correspond to, one of those particular previously determined indeterminate state locations, then a query session invitation will be presented. If the consumer 138 transitions to a receptive state, the a query session will be initiated. On the other hand, if the consumer 138 transitions to the unreceptive state, the query session will not be initiated.

One skilled in the art appreciates that particular locations and/or particular location attributes may be defined differently for different consumers 138. That is, the current location and/or an associated location attribute may be defined as a receptive state location for a first user, may be defined as an unreceptive state location of a different second consumer 138, and may be defined as an indeterminate state location for a different third consumer 138.

Non-limiting examples of receptive state locations may include a bathroom, an elevator, location of an automobile, a couch or chair, a gym locker room, or the like where the consumer 138 is not engaged in an activity that they should not be distracted from. Non-limiting examples of unreceptive state locations may include a restaurant, a pool, location of an automobile, a couch or chair, a gym locker room, or the like where the consumer 138 is likely engaged in an activity that they should not be distracted from. As indicated by the example locations above, some locations may be learned to be a receptive state location or an unreceptive state location. For example, a parked automobile in the residence driveway of the consumer 138 may be learned to be a suitable receptive state location, while other locations that the automobile may be currently located at may be learned to be unreceptive state locations. As another example, for a particular consumer 138, the gym locker room may be learned to be a suitable receptive state location. However, for a different consumer 138 (who may be engaging with other gym members), the gym locker room may learned to be an unreceptive state location.

Further, because an AI system is used to define locations as being receptive state locations, unreceptive state locations or indeterminate state locations, a location attribute associated with a particular location (interchangeably referred to herein as a location attribute) may be associated with the learned state. This associated information may be optionally saved into the pairing information storage device 210. For example, a first location may be known to be the residence bathroom of the home of the consumer 138. Other locations may also be known to be bathrooms (also known as a restroom or a lavatory), such as a public restroom at a public location, a restroom at a restaurant, a restroom at a theatre, or a workplace restroom located at the employment location of the consumer 138. Thus, the AI system may learn that theses other locations characterized as being a type of bathroom may be associated with the same state as the residence bathroom because their associated location attribute is the same as, or is similar to, the associated location attribute of the known location.

Further, a secondary location attribute associated with a particular location may also be used to define the location state. For example, the consumer 138 may have been unwilling to interact with a presented conversational avatar 102 while at the restroom of a restaurant (here, the location attributes are a bathroom and a restaurant). Various location attributes associated with a restaurant are known to be different from location attributes associated with a residence. Here, the AI system would learn that restroom locations associated with restaurants should be defined as unreceptive state locations if the consumer 138 is consistently unwilling to respond to and participate in a query session. Thus, when the consumer 138 is at the same restaurant or in the restroom of a different restaurant, that particular current location (in a restroom located in a restaurant) will be determined to be an unreceptive state location.

In some situations, a location attribute may have a priority over other location attributes. For example, a location attribute such as a restaurant bathroom may be defined to always be associated with the unreceptive state. Accordingly, even if other location attributes are available for a particular location, a restaurant bathroom would never be associated with the receptive state or the indeterminate state.

As another example, the consumer 138 may be currently located in a shopping mall or other public shopping area. In some instances, the current location of the consumer 138 in the shopping mall may be associated with the receptive state, such as when the consumer 138 is walking between different shops (and there is a sufficient duration of walking time to conduct a query session). For example, the consumer 138 may be browsing through clothes while in a clothing store. Such browsing may not be a task (activity) that requires a high degree of concentration on the part of the consumer 138. Here, that store location may be associated with the receptive state or the indeterminate state.

Embodiments may learn about other locations that should be associated with the unreceptive state. For example, the consumer 138 may be in a store that requires a relatively high degree of concentration to identify a potential purchase and/or to discriminate between candidate purchase options/alternatives. For example, the consumer 138 may be buying jewelry in a jewelry store or electronics in an electronics store. Here, such location attributes (having a characteristic or attribute of being a jewelry store or an electronics store) may be associated with the unreceptive state because the consumer 138 should not be disturbed from their purchase decision. These location related activities and/or location attribute related activities, and their associated state, may be saved into the event/state pairing database.

Summarizing, embodiments monitor in real time, in near real time, or periodically, the current location of the mobile consumer conversation acquisition system 108, which presumably corresponds to the current location of the consumer 138. When the consumer 138 is currently located in a location that is associated with a receptive state (defined herein as a receptive state location), presentation of a query session may be initiated. Conversely, when the consumer 138 is currently located at an unreceptive state location, presentation of a query session is not initiated. When the consumer 138 is currently located at an indeterminate state location, presentation of a query session invitation is presented.

Further, some embodiments of the location determination system 222 are optionally configured to sense motion, determine a rate of movement (such as velocity and/or acceleration), and/or determine a direction of movement (based on a change in angular orientation). A location determination system 222 that senses motion, determines a rate of movement, and/or determines a direction of movement may be implemented using any suitable Microelectromechanical system (MEMS), also known as micro-electro-mechanical, microelectronic systems, or the like. A MEMS system utilizes microscopic scale mechanical devices that sense lateral or rotational movements of the structure that they are affixed to. Any suitable MEMS system now known or later developed may be used in the various embodiments.

Movement, rate of movement (acceleration, speed or/or velocity), and/or direction of movement may be used as a characteristic that is used to determine whether the consumer 138 is in a receptive state, an unreceptive state, or an indeterminate state. The movement, rate of movement, and/or direction of movement information coupled with a determination of current location may further enhance the reliability of a determination of whether the consumer 138 is in a receptive state, an unreceptive state, or an indeterminate state.

For example, a current location may be determined to be the front door of the residence of the consumer 138, the rate of movement may indicate that the consumer is walking, and the direction of movement may indicate that the consumer 138 is going on a stroll or walk for recreation and/or for exercise (such as when walking down their residence sidewalk to towards the street or street sidewalk). Accordingly, embodiments may learn that this location and/or activity situation corresponds to a receptive state location because the consumer 138 is undertaking an activity that is well suited for interacting with a presented conversational avatar 102.

In contrast, the current location may be determined to be the front door of the residence of the consumer 138, the rate of movement may indicate that the consumer is walking, and the direction of movement may indicate that the consumer 138 is walking to their automobile located in their residence driveway. Accordingly, embodiments may learn that this location and/or activity situation corresponds to an unreceptive state location because the consumer 138 is undertaking an short duration activity that is not well suited for interacting with a presented conversational avatar 102. Here, when the previous situation has occurred, the duration of the time of this activity has been determined and saved. Over a number of instances, the conversational avatar system 100 will learn that there will be a sufficient amount of time to conduct a query session.

Further, the determined duration may be used to define a query session. For example, a short duration may allow for only a limited number of query session questions and/or comments. A longer duration may permit a greater number of query session questions and/or comments. Accordingly, such location-based activity duration information associated with an activity is saved for later use in defining the duration of a query session and/or for selecting particular query session questions and/or comments.

As yet another non-limiting example of a location-based activity, the current location may be determined to be the front door of the workplace of the consumer 138, the rate of movement may indicate that the consumer is walking, and the direction of movement may indicate that the consumer 138 is walking to their automobile located in the parking lot that the consumer 138 typically parks their automobile while at work. Over time, if the consumer 138 has participated in a query session for that location-based activity, then that particular location-based activity is associated with the receptive state. That is, embodiments may learn that this location-based activity corresponds to a receptive state location because the consumer 138 is undertaking a longer duration activity (walking from work to their parked automobile) that is well suited for interacting with a presented conversational avatar 102.

Speed of movement may be another attribute that can be used to determine whether the consumer 138 is in a receptive state, an unreceptive state, or an indeterminate state. For example, and as noted above, a first determined velocity may be associated with walking or running. A faster determined velocity may be determined to be associated with driving an automobile. An even faster velocity may be associated with airplane or train travel. Travelling on an airplane or a train, which corresponds to travel at a high rate of speed, may be associated with a receptive state. Accordingly, a high rate of speed may be associated with a receptive state. Therefore, a query session may be initiated in response to determining that the consumer 138 is travelling in an airplane or train (based on the determined speed of movement).

In contrast, determining that the consumer 138 is travelling in an automobile may not be sufficient, alone, to determine whether the consumer 138 is in a receptive state, an unreceptive state, or an indeterminate state. Current location information could be used to supplement the determination of whether the consumer 138 is in a receptive state, an unreceptive state, or an indeterminate state. Here, if the user is driving along a particularly dangerous or complex roadway (such as a roundabout or an highway interchange), the current location coupled with the determined speed may indicate that the consumer 138 is in an unreceptive state. In contrast, if the consumer 138 is currently travelling on a long straight stretch of highway that is relatively safe, the consumer 138 may be determined to be in a receptive state. Here, the determined speed of travel and a determination of a constant direction of travel may indicate that the consumer 138 is travelling down a straight stretch of highway, and therefore, that this location-based activity (the activity of driving down a straight stretch of highway, where the location is an automobile) should be associated with the receptive state. These location-based activities, and their associated state, may be saved into the event/state pairing database.

As yet another example, the current location information of the consumer 138 may indicate that the consumer 138 is not driving, but rather is seated as a passenger in an automobile. When the consumer 138 is a passenger, they may be determined to be in the receptive state. Here, an electronic device 230 located in the automobile may be in communication with (communicatively coupled to) the consumer conversation acquisition system 108. The supplemental information provided by the electronic device 230 may indicate that the consumer 138 is a passenger in the automobile. For example, the electronic device 230 in the automobile may include a pressure sensor that determines if someone is seated in a particular seat of the automobile. That is, location may be defined by the various embodiments relative to the consumer's location within or with respect to some object, such as an automobile, a train, a ship, and aircraft or the like.

Accordingly, embodiments of the consumer conversation acquisition system 108 are configured to receive information from another electronic device 230 that it is communicatively coupled to and that provides supplemental information pertaining to the consumer 138. This supplemental information may be used, in part, to determine whether the consumer 138 is in a receptive state, an unreceptive state, or an indeterminate state. Any suitable electronic device 230 may be used by the various embodiments to provide supplemental information that facilitates the determination of whether the consumer 138 is in a receptive state, an unreceptive state, or an indeterminate state.

Another example of an electronic device 230 is a communication device, such as a cellular phone or the like. If the consumer 138 is engaged in voice communications (an activity) or data communications (an activity) using their cellular phone, the consumer 138 is most likely engaged in a relatively complex task that they should not be disturbed from (because the conversation or data acquisition activity requires a relatively high degree of concentration from the consumer 138). Here, the electronic device 230 provides supplemental information that indicates the consumer 138 is engaged in a particular task (such as talking on their phone). Accordingly, the consumer conversation acquisition system 108 determines that the consumer 138 is in an unreceptive state (since they are engaged in a phone conversation).

The microphone 216 may also be used to detect sounds in proximity to the consumer conversation acquisition system 108. The detected sound may be analyzed to determine a characteristic of the detected sound. The determined characteristic of the sound may then be used to determine whether the consumer 138 is engaged in a particular activity that should be associated with a receptive state, an unreceptive state, or an indeterminate state. For example, sounds detected by the microphone 216 may indicate that the consumer 138 is actively involved in an ongoing conversation with another present person in their physical proximity and/or is having an conversation using their cellular phone. The detected sounds are analyzed with a suitable speech recognition system to identify spoken words (wherein the determined characteristic of the detected sound is an identification of spoken words or dialogue being exchanged between the consumer 138 and another person). The context of the spoken words, or speech, may be further analyzed to determine the nature of the determined spoken words. For example, the detected sounds may indicate that the consumer 138 is talking with another person. Here, the consumer conversation acquisition system 108 determines that the consumer 138 is in an unreceptive state (since they are engaged in an ongoing conversation with another person). This determination may be made regardless of the determination of the current location. That is, such determined activity factors will override the state for that location that has been previously stored in the event/state pairing database.

In another example, the spoken words may indicate that the consumer 138 is listening to a television program. Here, the detected sounds will include speech being spoken by the consumer 138 or another individual. The determined speech is analyzed with an AI system, wherein a determination is made that the detected speech is presentation of the audio portion of a television program or the like (wherein the determined characteristic of the presented sound is presentation of the audio portion of the television program or the like). Accordingly, a query session or a query session invitation may then be presented to the consumer 138.

As yet another example, dialogue determined from the sounds detected by the microphone 216 may indicate that the consumer 138 is engaged in an activity, such as listening to some audio presentation, that requires a relatively high degree of concentration. This activity is associated with the unreceptive state, and therefore, the consumer 138 should not be disturbed by a query session or a query session invitation. Here, the consumer 138 may be listening to an audio lecture, viewing a newscast, or may be otherwise consuming presentation of audio content that has a characteristic of pertaining to relatively complex subject matter. Accordingly, the analysis of the detected sounds that identifies this type of activity would be used to determine that the consumer 138 is in an unreceptive state. These location-based activities, and their associated state, may be saved into the event/state pairing database.

Conversely, sounds detected by the microphone 216 may indicate that the consumer 138 is likely in a receptive state, such as when listening to music. Listening to music (a characteristic of the detected sound) presumably does not require a high degree of concentration on the part of the consumer 138. In this situation, the detected sounds are analyzed to determine that the consumer 138 is listening to music. Here, the consumer conversation acquisition system 108 would then determine that the consumer 138 is in a receptive state (since they are not otherwise engaged in a conversation or other activity that requires a relatively high degree of concentration). This particular activity and the associated receptive state may be saved into the event/state pairing database.

Time of day, time of week, day, or the like may be associated with the receptive state, unreceptive state or indeterminate state. For example, late at night, when the consumer 138 is typically sleeping, may be associated with the unreceptive state. Here, the a current time of day is concurrently determined with determining the current location of the consumer conversation acquisition system 108. The comparing the current time of day with times of day associated with the receptive state and times of day associated with the unreceptive state. The consumer is determined to be in the unreceptive state when the current time of day matches times of day associated with the unreceptive state, such that the query session is not presented to the consumer.

Such times of day associated with the unreceptive state may also be associated with an activity typically performed at that time, such as going to work, going home, exercising, watching TV at home. In contrast, typical activities associated with a different particular time of day may be associated with the consumer 138 being in a receptive state or an indeterminate state. These time of day or week and state pairs, and/or these time-based activities and state pairs, may be saved into the event/state pairing database.

In some embodiments, acquired biometric information can be used as a factor to determine whether the consumer 138 is in a receptive state, an unreceptive state, or an indeterminate state. Here, the acquired biometric information may be used to determine an emotional state of the consumer 138 by comparing the current emotional state of the consumer with emotional states associated with the receptive state and emotional associated with the unreceptive state. For example, the consumer 138 may be determined to be in a relatively distressed state of emotion, such as during the death of a loved one, loss of a job, or the like. Based on this emotional state, embodiments determine that the consumer 138 is in an unreceptive state and should not be disturbed with initiation of a query session (because a query session would likely interfere with the grief of the consumer 138). As another example, the consumer 138 may be experiencing a high degree of joy or satisfaction. Accordingly, embodiments determine that the consumer 138 is in an unreceptive state and should not be disturbed with initiation of a query session (which might otherwise end or at least decrease their current joyful or satisfied emotional state). On the other hand, the consumer 138 may currently be in a relatively neutral emotional state (where the consumer is not particularly distressed nor joyful, for example). With this emotional state, embodiments determine that the consumer 138 is in a receptive state, or at leas an indeterminate state, and could be disturbed with initiation of a query session or a query session invitation. These emotional states, and their associated state of the consumer 138, may be saved into the event/state pairing database.

In some embodiments, image information acquired by the image capture device 218 may be used to identify a particular activity that the consumer 138 is undertaking. In some instances, if the consumer conversation acquisition system 108 is implemented as user-wearable device, then image analysis using an object recognition algorithm may be used to identify the current activity of the consumer 138. For example, the consumer 138 may be participating in a sporting activity (baseball, handball, tennis, football, soccer, racing, etc.). Here, the participating in this type of activity requires a relatively high degree of concentration on the part of the consumer 138. Accordingly, embodiments determine that the consumer 138 is in an unreceptive state and should not be disturbed by a query session. In contrast, the consumer 138 may be sitting or walking alone in a park-like setting with their pet. Here, this type of activity requires a relatively low degree of concentration on the part of the consumer 138. Accordingly, embodiments determine that the consumer 138 is in a receptive state, and could therefore be disturbed with initiation of a query session or a query session invitation. These activities, and their associated state, may be saved into the event/state pairing database.

In some situations, the consumer conversation acquisition system 108 is not a mobile device. Rather, the consumer conversation acquisition system 108 is a stationary system or device, or is implemented in a stationary system or device, or is in communication with a stationary system or device. Here, a stationary consumer conversation acquisition system or device is defined as a system or device that is stationary after the system or device has been initially set up for use by the consumer 138. Typically, stationary systems or devices are not intended to be portable during their use by the consumer 138. A non-limiting example of a stationary consumer conversation acquisition system 108 or device is a set top box, television, or the like. In contrast, a mobile system or device, such as a cell phone or the mobile electronic device, is indented to be mobile (moved with and/or carried by the consumer 138). In some instances during actual use, the mobile system or mobile device may not be moving (is stationary) only because the consumer 138 operating the mobile system or mobile device is simply not moving.

The stationary consumer conversation acquisition system 108 or device is not always in proximity to the consumer 138. Examples include a set top box, gaming system, stereo, or the like that is located in a fixed location where the device is used by the consumer 138. Here, "use" of the device is associated with proximity to the consumer 138. That is, embodiments determine if the stationary device is in use or is being operated by the consumer 138, and therefore, learns that the consumer 138 is nearby. Particular device operations are associated with a particular state of the consumer 138. Then, based on a current operation being performed by the stationary consumer conversation acquisition system 108, the AI system determines whether the consumer 138 is in a receptive state (and is willing to participate in a query session), may be an unreceptive state (and not willing to participates in a query session), or optionally may be in an indeterminate state based on the current operation of the device.

In such situations, the operation being performed by the stationary device is monitored, and particular operations that may be performed by the stationary device are associated with the receptive state, unreceptive state or indeterminate state. These device operations, and their associated state, may be saved into the event/state pairing database.

In practice, when the device is in use, operations currently being performed are monitored on a real time basis, near real time basis, or periodically. The current operation is compared with the device operation/state pairs stored in the event/state pairing database. If the current operation corresponds to an operation stored in the event/state pairing database, then the associated state is accessed to determine whether a query session or a query session invitation should be initiated.

An exemplary stationary device is a set top box that receives and presents media content events. One example operation is presentation of a visual portion of the media content event on the display 232 and an audible portion from the speaker(s) 234. Since it is generally not desirable to interrupt presentation of the media content event, such an operation is associated with the unreceptive state. Here, presentation of a query session or a query session invitation would not be initiated.

On the other hand, the current operation being performed by the set top box may be presentation of a commercial, advertisement or the like. Or, there may be presentation of songs and/or gaps in the actor's dialogue. These particular operations may be associated with the receptive state because the consumer 138, when watching a commercial or an advertisement, listening to a gap in dialogue, or listing to a song, is most likely not a state that they should not be disturbed from. Thus, as a commercial or advertisement, a gap in dialogue, or a song is being presented to the consumer 138, then a query session or presentation of a query session invitation may be initiated. Presentation of the query session may conclude when presentation of the song, commercial or advertisement ends.

As another example, the presentation of the opening and/or closing credits for a media content event may be determined. Opening or closing credits may be identified based on metadata or other information included in the subject media content event. Alternatively, image analysis of the video content may be used to identify text that is associated with the opening or closing credits. During the opening and/or closing credits, the consumer 138 may be presented with a query session or a query session invitation.

In some instances, the operation may be related to the subject media content event that a particular query session pertains to. For example, a particular media content event may be currently being presented on the display 230. A particular presenting scene may be related to the subject media content event. In another situations, the currently presenting media content event may be the same as the subject media content event. Here, during a specific portion of the currently presenting media content event, current presentation of the media content event may be automatically paused for initiation of a query session or presentation of a query session invitation. Presentation may automatically resume after conclusion of the query session and/or the query session invitation.

Alternatively, a query session invitation may be presented during continuing presentation of the media content event. If the consumer 138 accepts, the presentation of the media content event is automatically paused and the query session is initiated. Presentation may automatically resume after conclusion of the query session.

In some situations, the state of the user may be determined based on preference specifications previously made by the consumer 138. The user may have defined a particular activity or event from which they are willing to be disturbed from by a query session or a query session invitation. For example, the consumer 138 may indicate that presentation of a commercial, advertisement or the like may be suitable for defining as a receptive state. As another example, the consumer 138 may indicate that during the weather reports of a newscast program, that they are not to be disturbed by a query session or a query session invitation (such that this activity is defined to be an unreceptive state). During time out periods of a broadcasting sporting event, the consumer 138 may specify that they might be willing to participate in a query session (such that this activity is defined as an indeterminate state).

In such embodiments, particularly in situations where the consumer 138 has optionally specified their preferences, the currently broadcasting media content event may be monitored to identify particular activities currently being presented to the consumer 138. Metadata of the media content stream may be monitored to identify particular activities currently being presented. Alternatively, or additionally, closed captioning text may be monitored to identify particular activities currently being presented. If the consumer conversation acquisition system 108 is not itself presenting a media content event, the microphones may monitor the presented audible portion of the currently presenting media content event to identify particular activities currently being presented (using a natural language identification algorithm). Alternatively, or additionally, if the consumer conversation acquisition system 108 is not itself presenting a media content event, the image capture device 218 may monitor the presented video portion of the currently presenting media content event to identify particular activities currently being presented (using an image recognition algorithm). Alternatively, or additionally, the media presentation system itself may communicate information to the consumer conversation acquisition system 108 so that the consumer conversation acquisition system 108 may identify particular activities currently being presented.

Summarizing, based on prior activities (location events) acquired by the consumer conversation acquisition system 108, determination of current location, detection of movement (motion, rate of movement, direction of movement), type of activity, time, use of a device, or the like is associated with one of a receptive state (where the consumer 138 is most likely willing to participate in a query session), an unreceptive state (where the consumer 138 is most likely not willing to participates in a query session), or optionally an indeterminate state (where the consumer 138 may be inclined to transition into a receptive state). The associated information (current event/state, detection of movement/state, type of activity/state, time/state, use of a device/state or the like) is then stored into an event/state pairing database residing in a pairing information storage device 210.

In some embodiments, and preferably when the consumer conversation acquisition system 108 is portable or is implemented in a portable device that is in the possession of the consumer 138, an audio query session or query session invitation is presented as audible sounds emitted by the speaker(s) 224. An example consumer conversation acquisition system 108 may implement the speaker(s) as ear buds, headphones, speaker ear pieces, or the like. Alternatively, the speaker(s) 224 may emit sounds into the ambient environment which are heard by the consumer 138, such as from automobile speakers or media presentation system speakers.

The conversational avatar 102 may audibly present the questions and/or remarks using any suitable synthesized voice algorithm or generation system that can be understood by the consumer 138. Any suitable language may be used, and may optionally be selected based on a predefined consumer preference. The synthesized voice may emulate the voice of a generic person, an animated character, a famous actor, or a friend or relative of the consumer 138. Any suitable synthesized voice may be used by the various embodiments. Further, the particular synthesized voice may be particular to the currently presenting query session. For example, if the subject media content event is an animated-based media content event, then the synthesized voice may emulate a selected one of the animated characters. As another example, if the subject media content event is film-based media content event, then the synthesized voice may emulate a selected one of the actors of the media content event.

During a query session, various types of supplemental information may be presented to the consumer 138 to help the consumer 138 recall their experiences when they consumed the subject media content event. For example, music, songs, dialogue, and/or other soundtrack portions from the subject media content event may be audible presented to the consumer 138. Such audible sounds, in concert with related questions and/or comments, would remind the consumer 138 of their experiences, and therefore result in a more meaningful and relevant reply to the presented questions and/or comments.

If the query session includes visual presentation of an animated graphical conversational avatar 102 on the display 226, 232, then the animated graphical conversational avatar 102 may be inserted into a portion of the currently presenting media content event. The location of the presented animated graphical conversational avatar 102 may be selected so as to be minimally disruptive, such as in the background and/or along the periphery of the currently presenting media content event. The presentation size of the animated graphical conversational avatar 102 may also be defined so as to be minimally disruptive to the currently presenting media content event and/or to fit within some preferred region of the currently presenting media content event.

Additionally, or alternatively, embodiments may present an object from the scene of the subject media content event. Preferably, the presented object is related to the question and/or comment that is currently being presented to the consumer 138. Further, an object recognitions algorithm could be used to identify a particular object in a currently presenting media content event. Then, an object associated with the subject media content event could be used to replace or be presented over the identified object.

Additionally, or alternatively, the animated graphical conversational avatar 102 could be the "object" that is placed over a person or actor that is being presented in the currently presenting media content event. The position, orientation, and/or gestures made by the conversational avatar 102 could be configured to match the position, orientation, and/or gestures of the replaced person or actor. Here, the questions and/or comments audibly being presented by the conversational avatar 102 would replace the audio portion of the currently presenting media content event. As an example, the newscaster of a newscast program may be replaced with the animated graphical conversational avatar 102. The animated graphical conversational avatar 102 may then audibly present the query session questions and/or comments (or the query session invitation).

As noted herein, the query session questions and/or comments may be determined for a particular consumer 138. In some instances, the consumer 138 may have recently consumed the subject media content event. Accordingly, the query session questions and/or comments may be relatively subtle (intuitive) and/or may be directly related to a description of a particular scene, event and/or story line of the subject media content event that the consumer 138 is likely to recall with particularity. On the other hand, if the consumer 138 had consumed the subject media content event a relatively long time ago, and thus may not recall with a high degree of particularity details of the subject media content event and/or their experiences, the query session questions and/or comments may be more blunt and/or descriptive of the scene, event and/or story line of the subject media content event. Or, the query session questions and/or comments may bluntly ask the consumer 138 about their observed reaction (which was previously acquired) to a particular scene, event and/or story line during their original consumption of the subject media content event.

In some embodiments, a plurality of animated graphical conversational avatars 102 may be presented to the consumer 138 during a query session. The audio portion of the query session may be configured so as to emulate a conversation among the different presented animated graphical conversational avatars 102 and with the consumer 138.

In some instances, an animated graphical conversational avatar 102 may be configured to emulate a close friend, or relative of the consumer 138. Here, the consumer 138 may be enticed to give more honest and relevant responses since they are among a group of friends and/or relatives. Such embodiments may be particularly suited when the conversational avatar system 100 is coupled to, or integrated within, a social media platform. And, the query session could be presented to the consumer 138 using a 3-D virtual reality system so that the consumer 138 experiences the query session in a virtual reality world.

Further, some embodiments may be configured to present a coordinated query session among multiple consumers 138. For example, if a 3-D virtual reality system is used to present a virtual world, then the consumer 138 may be able to view the other consumers 138 as they are participating in and responding to the query session questions and/or comments. Such applications of the conversational avatar system 100 that simulate a group roundtable environment may be particularly effective when the other participating consumers 138 are friends or relatives. In some situations, incentives may be offered so as to entice the plurality of consumers 138 to participate in a coordinated query session.

In the various embodiments, the responses made by the consumer 138 during the query session are acquired and then are stored. However, some embodiments may be additionally or alternatively configured to enable the studio or a designated representative to monitor an ongoing query session in real time. Here, the studio or the designated representative may control the flow and/or direction of the line of questions and/or comments that are being presented to the consumer 138 during the query session. For example, the response of the consumer 138 may have not been fully expressive of their reaction or experience to the scene, event and/or story line of the subject media content event. Thus, the studio or representative may add supplemental questions and/or comments into the query session to elicit a supplemental and/or clarifying response from the consumer 138. As another example, if a "gap" in the conversation between the consumer 138 and the conversational avatar 102 occurs during the query session, the studio or representative may manually specify and interject questions and/or comments to stimulate the continuing conversation between the consumer 138 and the conversational avatar 102.

It should be emphasized that the above-described embodiments of the conversational avatar system 100 are merely possible examples of implementations of the invention. Many variations and modifications may be made to the above-described embodiments. All such modifications and variations are intended to be included herein within the scope of this disclosure and protected by the following claims.

What is claimed is:

1. A method for acquiring responses from a consumer pertaining to a subject media content event that has been previously consumed by the consumer, the method comprising:

determining a current location of a consumer conversation acquisition system, wherein the consumer conversation acquisition system is a mobile electronic device and the current location is determined with a global positioning system;

accessing stored state information that identifies at least one of a receptive state of the consumer and an unreceptive state of the consumer, wherein a plurality of locations are each associated with state information for the consumer, and wherein the current location is compared with the plurality of locations such that the associated state information is accessed for the location that is the same as the determined current location;

detecting sound using a microphone at the determined current location of the consumer conversation acquisition system;

determining a characteristic of the detected sound;

determining that the consumer is in the receptive state when the characteristic of the detected sound is music;

determining that the consumer is in the unreceptive state when the characteristic of the detected sound is an ongoing conversation between the consumer and another person;

presenting a query session to the consumer when the associated state information for the consumer is the receptive state, including presenting an animated graphical conversational avatar on a display during the query session, wherein the animated graphical conversational avatar appears to speak the words of audible questions presented to the consumer via at least one speaker that pertain to the subject media content event that the consumer has previously consumed;

wherein a video portion of a media content event is currently being presented on the display, wherein an audio portion of the media content event is being presented from the at least one speaker, and wherein presenting the animated graphical conversational avatar on the display further comprises:

identifying an object being presented in the video portion of the currently present media content event;

overlaying the animated graphical conversational avatar on the object being presented in the video portion of the currently present media content event; and replacing the audio portion of the media content event with the audible questions of the query session;

acquiring response information that corresponds to a response of the consumer to each one of the presented audible questions of the query session, wherein acquiring the response information to at least one of the presented audible questions of the query session comprises:

detecting sound with the microphone after presentation of the audible question, wherein the detected sound includes a verbal response of the consumer;

detecting a physical response of the consumer with a biometric sensor after presentation of the audible question;

capturing a video or a series of still images of the consumer with an image capture device after presentation of the audible question;

recording the detected sound, the detected physical response and the captured video or a series of still images of the consumer, wherein the recorded sound, the recorded physical response and the recorded video or a series of still images of the consumer are time synchronized with each other; and associating the recorded sound, the recorded physical response, and the recorded video or the series of still images of the consumer with the presented audible question; and storing the acquired response information for each of the presented audible questions.

2. The method of claim 1, wherein presenting the query session comprises:

presenting at least one audible comment pertaining to the subject media content event, wherein the at least one audible comment is intended to elicit a response from the consumer;

acquiring response information that corresponds to a response of the consumer to the at least one audible comment; and storing the acquired response information, wherein the acquired response information is associated with the presented audible comment.

3. The method of claim 1, wherein a commercial or an advertisement of a presenting media content event is currently being presented on the display, wherein the commercial or an advertisement includes a video portion that is currently being presented on the display and an audio portion that is being presented from the at least one speaker, and wherein presenting the animated graphical conversational avatar on the display further comprises:

presenting the animated graphical conversational avatar on the display during the duration of the commercial or the advertisement; and replacing the audio portion of the commercial or the advertisement with the audible questions of the query session.

4. The method of claim 1, further comprising, determining words spoken by the consumer from the recorded sound;

and associating the determined words with the presented audible question.

5. The method of claim 1, further comprising, determining an emotion of the consumer from the recorded physical response; and associating the determined emotional response with the presented audible question.

6. The method of claim 1, further comprising, determining a non-verbal response of the consumer from the captured video or a series of still images of the consumer; and associating the determined non-verbal response with the presented audible question.

7. The method of claim 1, wherein at least one of the plurality of locations is further associated with an activity that the consumer has been engaged in while at that particular location, and wherein the activity is associated with one of the receptive state and the unreceptive state, the method further comprising:

presenting the query session to the consumer when the activity associated with the current location is the receptive state.

8. The method of claim 1, wherein at least one of the plurality of locations is further associated with an activity that the consumer has been engaged in while at that particular location, and wherein the activity is associated with one of the receptive state and the unreceptive state, the method further comprising:

not presenting the query session to the consumer when the activity associated with the current location is the unreceptive state, wherein the query session is not presented even if the current location corresponds to the particular location that is associated with the receptive state.

9. The method of claim 1, wherein prior to presenting the query session to the consumer when the associated state information for the consumer is the receptive state, the method further comprising:

determining that the consumer is in an indeterminate state;

presenting a query session invitation to the consumer in response to determining that the consumer is in the indeterminate state, wherein the query session invitation invites the consumer to participate in the query session;

receiving an acceptance of the query session invitation from the consumer, wherein the acceptance indicates that the consumer is willing to participate in the query session; and initiating presentation of the query session in response to receiving the acceptance of the query session invitation.

10. The method of claim 9, further comprising:

receiving a decline of the query session invitation from the consumer, wherein the acceptance indicates that the consumer is not willing to participate in the query session, wherein the query session is not presented to the consumer in response to the consumer declining the query session invitation.

11. The method of claim 1, further comprising:

determining a current time of day concurrently with determining the current location of the consumer conversation acquisition system;

comparing the current time of day with times of day associated with the receptive state and times of day associated with the unreceptive state; and determining that the consumer is in the unreceptive state when the current time of day matches times of day associated with the unreceptive state, wherein the query session is not presented to the consumer.

12. The method of claim 1, further comprising:

determining a current emotional state of the consumer concurrently with determining the current location of the consumer conversation acquisition system, wherein the current emotional state of the consumer is determined based on biometric information received from a biometric sensor that is sensing a current condition of the consumer;

comparing the current emotional state of the consumer with emotional states associated with the receptive state and emotional states associated with the unreceptive state; and determining that the consumer is in the unreceptive state when the current emotional state of the consumer matches the emotional states associated with the unreceptive state, wherein the query session is not presented to the consumer.

* * * * *